United States Patent
Auyeung et al.

(10) Patent No.: US 6,891,890 B1
(45) Date of Patent: May 10, 2005

(54) MULTI-PHASE MOTION ESTIMATION SYSTEM AND METHOD

(75) Inventors: Cheung Auyeung, Sunnyvale, CA (US); Sho Long Chen, Saratoga, CA (US); Stanley H. Siu, Sunnyvale, CA (US)

(73) Assignee: VWEB Corporation, San Jose, CA (US)

( * ) Notice: Subject to any disclaimer, the term of this patent is extended or adjusted under 35 U.S.C. 154(b) by 593 days.

(21) Appl. No.: 09/842,199

(22) Filed: Apr. 24, 2001

(51) Int. Cl.$^7$ ................................................ H04N 7/18
(52) U.S. Cl. .............................. 375/240.16; 375/240.17
(58) Field of Search ........................ 375/240.11–240.17

(56) References Cited

U.S. PATENT DOCUMENTS

| | | | |
|---|---|---|---|
| 5,576,772 A | | 11/1996 | Kondo |
| 5,587,741 A | | 12/1996 | Kim |
| 6,154,519 A | * | 11/2000 | Florent et al. ................ 378/62 |
| 6,195,389 B1 | * | 2/2001 | Rodriguez et al. ..... 375/240.16 |
| 6,259,737 B1 | | 7/2001 | Fung et al. |
| 6,414,997 B1 | * | 7/2002 | Piccinelli et al. ...... 375/240.17 |
| 6,501,446 B1 | * | 12/2002 | De Haan et al. .............. 345/63 |
| 6,567,469 B1 | * | 5/2003 | Rackett ................. 375/240.16 |
| 2001/0028680 A1 | | 10/2001 | Gobert |
| 2002/0015513 A1 | | 2/2002 | Ando et al. |

FOREIGN PATENT DOCUMENTS

EP 0973336 A2 1/2000

* cited by examiner

*Primary Examiner*—Andy Rao
(74) *Attorney, Agent, or Firm*—Bever, Hoffman & Harms, LLP; Edwards S. Mao

(57) ABSTRACT

A method and system is provided for calculating motion vectors of macroblocks in a digital image of a digital video stream. The method and system reduces the computational overhead of calculating motion vectors computing difference measures using a multi-phase computational scheme. Specifically, the pixel blocks the previous image are divided into different groups. The closest matching pixel block of each group is determined in a first phase. Then a more accurate difference measure is used to determine the origin block from among the closest matching pixel blocks.

9 Claims, 16 Drawing Sheets

MULTI-PHASE MOTION ESTIMATION SYSTEM AND METHOD

CROSS-REFERENCE TO RELATED APPLICATIONS

This application relates to concurrently filed, co-pending application Ser. No. 09/842,201-5415, entitled "MOTION ESTIMATION USING PREDETERMINED PIXEL PATTERNS AND SUBPATTERNS", by Auyeung et al., and concurrently filed, co-pending application Ser. No. 09/842,365-6572, entitled "MOTION ESTIMATION USING MULTIPLE SEARCH WINDOWS", by Auyeung et al., both incorporated herein by reference.

BACKGROUND OF THE INVENTION

1. Field of the Invention

The present invention relates to digital video encoding, such as MPEG and AVI. More specifically, the present invention relates to methods of motion estimation for encoding digital images of a digital video stream.

2. Discussion of Related Art

Due to the advancement of semiconductor processing technology, integrated circuits (ICs) have greatly increased in functionality and complexity. With increasing processing and memory capabilities, many formerly analog tasks are being performed digitally. For example, images, audio and even full motion video can now be produced, distributed, and used in digital formats.

FIG. 1(a) is an illustrative diagram of a digital video stream 100. Digital video stream 100 comprises a series of individual digital images 100_0 to 100_N, each digital image of a video stream is often called a frame. For full motion video a video frame rate of 60 images per second is desired. As illustrated in FIG. 1(b), a digital image 100_Z comprises a plurality of picture elements (pixels). Specifically, digital image 100_Z comprises Y rows of X pixels. For clarity, pixels in a digital image are identified using a 2-dimensional coordinate system. As shown in FIG. 1(b), pixel P(0,0) is in the top left corner of digital image 100_Z. Pixel P(X−1,0) is in the top right corner of digital image 100_Z. Pixel P(0,Y−1) is in the bottom left corner and pixel P(X−1, Y−1) is in the bottom right corner. Typical image sizes for digital video streams include 720×480, 640×480, 320×240 and 160×120.

FIG. 2 shows a typical digital video system 200, which includes a video capture device 210, a video encoder 220, a video channel 225, a video decoder 230, a video display 240, and an optional video storage system 250. Video capture device 210, typically a video camera, provides a video stream to video encoder 220. Video encoder 220 digitizes and encodes the video stream and sends the encoded digital video stream over channel 225 to video decoder 230. Video decoder 230 decodes the encoded video stream from channel 225 and displays the video images on video display 240. Channel 225 could be for example, a local area network, the internet, telephone lines with modems, or any other communication connections. Video decoder 230 could also receive a video data stream from video storage system 250. Video storage system 250 can be for example, a video compact disk system, a hard disk storing video data, or a digital video disk system.

A major problem with digital video system 200 is that channel 225 is typically limited in bandwidth. As explained above a full-motion digital video stream can comprise 60 images a second. Using an image size of 640×480, a full motion video stream would have 18.4 million pixels per second. In a full color video stream each pixel comprises three bytes of color data. Thus, a full motion video stream would require a transfer rate in excess of 52 megabytes a second over channel 225. For internet application most users can only support a bandwidth of approximately 56 Kilobits per second. Thus, to facilitate digital video over computer networks, such as the internet, digital video streams must be compressed.

One way to reduce the bandwidth requirement of a digital video stream is to avoid sending redundant information across channel 225. For example, as shown in FIG. 3, a digital video stream includes digital image 301 and 302. Digital image 301 includes a video object 310_1 and video object 340_1 on a blank background. Digital image 302 includes a video object 310_2, which is the same as video object 310_1, and a video object 340_2, which is the same as video object 340_1. Rather then sending data for all the pixels of digital image 301 and digital image 302, a digital video stream could be encoded to simply send the information that video object 310_1 from digital image 301 has moved three pixels to the left and two pixels down and that video object 340_1 from digital image 301 has moved one pixel down and four pixels to the left. Thus rather than sending all the pixels of image 302 across channel 225, video encoder 220 can send digital image 301 and the movement information, usually encoded as a two dimensional motion vector, regarding the objects in digital image 301 to video decoder 230. Video decoder 230 can then generate digital image 302 using digital image 301 and the motion vectors supplied by video encoder 220. Similarly, additional digital images in the digital video stream containing digital images 301 and 302 can be generated from additional motion vectors.

However, most full motion video streams do not contain simple objects such as video objects 310_1 and 340_1. Object recognition in real life images is a very complicated and time-consuming process. Thus, motion vectors based on video objects are not really suitable for encoding digital video data streams. However, it is possible to use motion vector encoding with artificial video objects. Rather than finding distinct objects in a digital image, the digital image is divided into a plurality of macroblocks. A macroblock is a number of adjacent pixels with a predetermined shape and size. Typically, a rectangular shape is used so that a rectangular digital image can be divided into an integer number of macroblocks. FIG. 4 illustrates a digital image 410 that is divided into a plurality of square macroblocks. For clarity, macroblocks are identified using a 2-dimensional coordinate system. As shown in FIG. 4, macroblock MB(0,0) is in the top left corner of digital image 410. Macroblock MB(X−1,0) is in the top right corner of digital image 410. Macroblock MB(0,Y−1) is in the bottom left corner and macroblock MB(X−1, Y−1) is in the bottom right corner. As illustrated in FIG. 5(a), a typical size for a macroblock 510 is eight pixels by eight pixels. As illustrated in FIG. 5(b), another typical size for a macroblock is 16 pixels by 16 pixels. For convenience, macroblocks and digital images are illustrated with bold lines after every four pixels in both the vertical and horizontal direction. These bold lines are for the convenience only and have no bearing on actual implementation of embodiments of the present invention.

To encode a digital image using macroblocks and motion vectors, each macroblock MB(x, y) of a digital image is compared with the preceding digital image to determine which area of the preceding image best matches macroblock MB(x, y). For convenience, the area of the preceding image best matching a macroblock is called an origin block OB. Typically, an origin block has the same size and shape as the macroblock. To determine the best matching origin block, a difference measure is used to measure the amount of difference between the macroblock and each possible origin block. Typically, a value such as the luminance of each pixel in the macroblock is compared to the luminance of a corresponding pixel in the origin block. The sum of absolute differences (SAD) of all the values (such as luminance) is the difference measure. Other embodiments of the present invention may use other difference measures. For example, one embodiment of the present invention uses the sum of square differences as the difference measures. For clarity, only SAD is described in detail, those skilled in the art can easily adapt other difference measures for use with different embodiments of the present invention. The lower the difference measure the better the match between the origin block and the macroblock.

The motion vector for macroblock MB(x, y) is simply the two-dimensional vector which defines the difference in location of a reference pixel on the origin block with a corresponding reference pixel on the macroblock. For convenience, the reference pixel in the examples contained herein uses the top left pixel of the macroblock and the origin block as the reference pixel. Thus for example, the reference pixel of macroblock MB(0,0) of FIG. 4 is pixel (0,0). Similarly the reference pixel of macroblock MB(X−1, Y−1) assuming an 8×8 reference block is pixel P(8*(X−1), 8*(Y−1)).

FIGS. 6(a)–6(f) illustrate a conventional matching method to find the object block in preceding image 601 for macroblock 610. The method in FIGS. 6(a)–6(f) is to compare each macroblock of a digital image with each pixel block, i.e., a block of pixels of the same size and same shape as the macroblock in the preceding image, to determine the difference measure for each pixel block. The pixel block with the lowest difference measure is determined to be the origin block of the macroblock. As illustrated in FIG. 6(a), a group of pixels 610 with reference pixel RP(0,0), in preceding image 601 is compared to an 8×8 macroblock MB(x, y) to determine a difference measure for the group of pixels 610. Then as illustrated in FIG. 6(b), the group of pixels 620 with reference pixel RP(1,0), is compared to macroblock MB(x, y) to determine a difference measure for pixel block 620. Each pixel block having a reference pixel RP(j,0), where j is an integer from 0 to 19, inclusive, compared to macroblock MB(x, y) to determine a difference measure for the pixel block. Finally as illustrated, in FIG. 6(c) pixel block 630, with reference pixel RP(19,0) is compared with macroblock MB(x, y) to find a difference measure for pixel block 630. In the method of FIGS. 6(a)–6(f) the last pixel block in a row must have at least half the columns of pixels as in macroblock M(x, y). However, in some methods the last pixel block in a row may contain as few as one column. Thus, in these embodiments a pixel block having reference pixel RP(22,0) (not shown) may be used.

As illustrated in FIG. 6(d), after pixel block 630, pixel block 640, with reference pixel (0,1), is compared with macroblock MB(x, y) to determine a difference measure for pixel block 640. Each pixel block to the right of group of pixel 650 is then in turn compared to macroblock MB(x, y) to determine difference measures for each pixel block. Eventually, as illustrated in FIG. 6(e), the group of pixels 660 having reference pixel RP(19,1) is compared with macroblock MB(x, y) to determine difference measures for pixel block 660. This process continues until finally as illustrated in FIG. 6(f), pixel block 690 with reference pixel (19,11) is compared with macroblock MB(x, y) to determine a difference measure for pixel block 690. In some methods, the process continues until a pixel block having only one pixel within preceding image 601, e.g., a pixel block having reference pixel (22, 15) is compared with macroblock MB(x, y). Furthermore some embodiments may start with pixel blocks having reference pixels with negative coordinates. For example, rather than starting with pixel block 610 having reference pixels RP(0, 0), some methods would start with a pixel block having reference pixel RP(−7, −7). Conventional padding techniques can be used to fill the pixel block which require pixels that are outside of preceding image 601. A common padding technique is to use a copy of the closest pixel from preceding image 601 for each pixel outside of preceding image 601.

For large digital images the method illustrated in FIGS. 6(a)–6(f) would require a very large number of calculations to encode a digital image. For example, a 640×480 image comprises 1200 16×16 macroblocks of 256 pixels each. To encode a digital image from a preceding digital image would require comparing each of the 1200 16×16 macroblocks with each of the 298,304 pixel blocks (16×16 blocks) in the preceding image. Each comparison would require calculating 256 absolute differences. Thus, encoding of a digital image requires calculating approximately 91.6 billion absolute differences. For many applications this large number of calculations is unacceptable. For example, real time digital video data may need to be encoded for live broadcasts over a computer network, such as the internet. Since a digital video sequence ideally has 60 frames per second, the method of FIGS. 6(a)–6(f) would require calculating approximately 5.4 trillion absolute differences per second. The computing power required to perform the calculations would be cost prohibitive for most applications. Hence there is a need for a method or structure to perform motion estimation for encoding digital video streams using motion vectors of macroblocks.

SUMMARY

Accordingly, the present invention provides a method and system for computing motion vectors of macroblocks of a digital image using a preceding image that reduces the computational burden of determining the motion vectors. In one embodiment of the present invention, a video encoder calculates the motion vector of a macroblock using a predetermined pattern of pixels rather than all the pixels of a previous image. Specifically, the video encoder calculates a difference measure for each pixel block of the previous image using the predetermined pattern of pixels. The pixel block having the lowest difference measure is selected as the origin block. The motion vector is computed using the origin block and the macroblock. Generally, the predetermined pattern of pixels includes less than or equal to half of the pixels in the previous image. For example, in a specific embodiment of the present invention the predetermined pattern of pixels includes a fourth of the pixels of the previous image.

Some embodiments of the present invention further reduce computational overhead by using a subpattern of the predetermined pattern of pixels. For example, in one embodiment of the present invention the subpattern of pixels includes one-fourth of the pixels of the predetermined pattern. The pixel blocks of the previous image are divided into different groups. For example, in one embodiment of the present invention the pixel blocks of the previous image are divided into 16 groups. A first-phase processing unit calculates a difference measure for each pixel block of a group of pixel blocks using the subpattern of pixels. Then, a comparator selects the closest matching pixel block for each group. The closest matching pixel block for each group has the smallest difference measure within the group. A second-phase processing unit calculates an accurate difference measure for each closest matching pixel block using the predetermined pattern of pixels. The closest matching pixel block having the smallest accurate difference measure is selected as the origin block.

Some embodiments of the present invention further reduce computational overhead by using a coarse search window and a fine search window. Rather than calculating difference measures for every pixel blocks of the previous image, difference measures are computed only for pixel blocks within the coarse search windows. The fine search window is defined within the coarse search window. A subset of the pixel blocks within the coarse search window is selected. The subset of pixel blocks includes all the pixel blocks within the fine search window. A difference measure is calculated for each pixel block in the subset of pixel blocks. The pixel block with the smallest difference measure is selected as the origin block. The motion vector for the macroblock is calculated from the origin block. Generally the subset of pixel blocks includes less than half of the pixel blocks outside the fine search window but within the coarse search window.

The present invention will be fully understood in view of the following description and drawings.

BRIEF DESCRIPTION OF THE DRAWINGS

FIG. 1(*b*) is a diagram of a digital image comprising picture elements (pixels).

DETAILED DESCRIPTION

As explained above, the computational task of computing motion vectors for full motion digital video is too great for most video encoding systems. Thus, embodiments of the present invention use one or more novel techniques to reduce the computational task required to determine the motion vectors of the macroblocks of a digital image of a digital video stream.

Figure 1A:
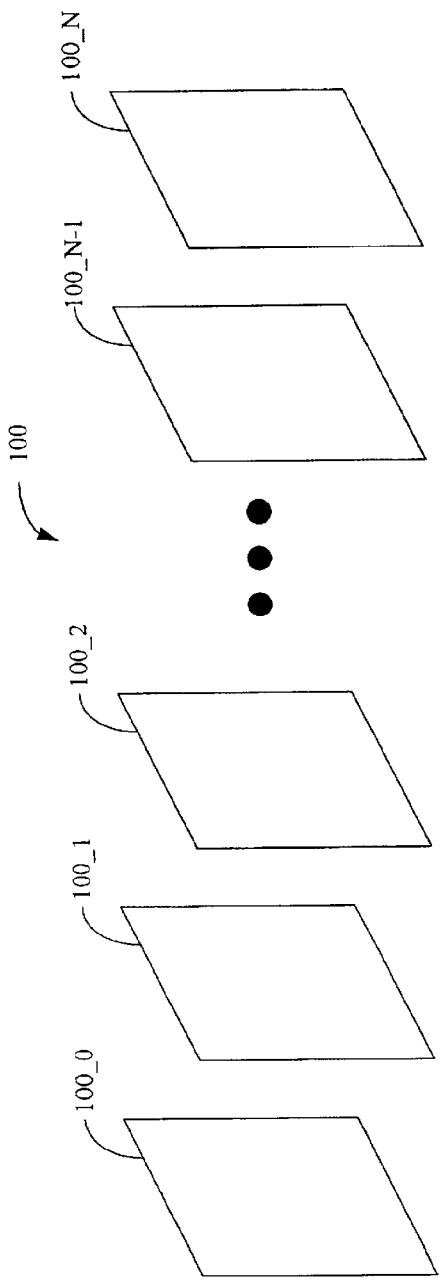
FIG. 1(*a*) is an illustration of a digital video stream of digital images.
Figure 1B:
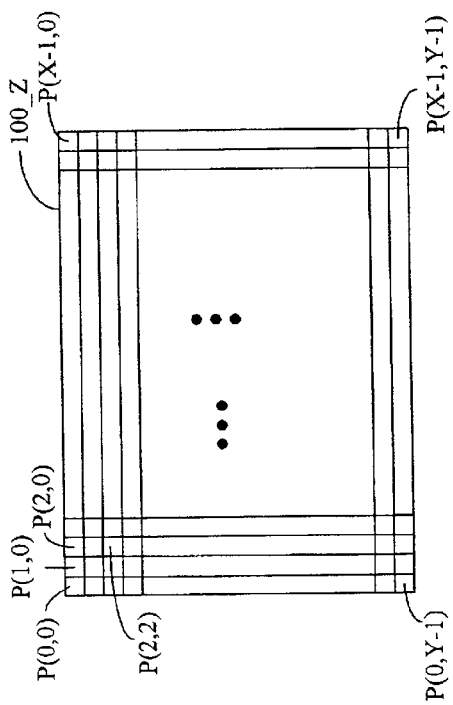
Figure 2:
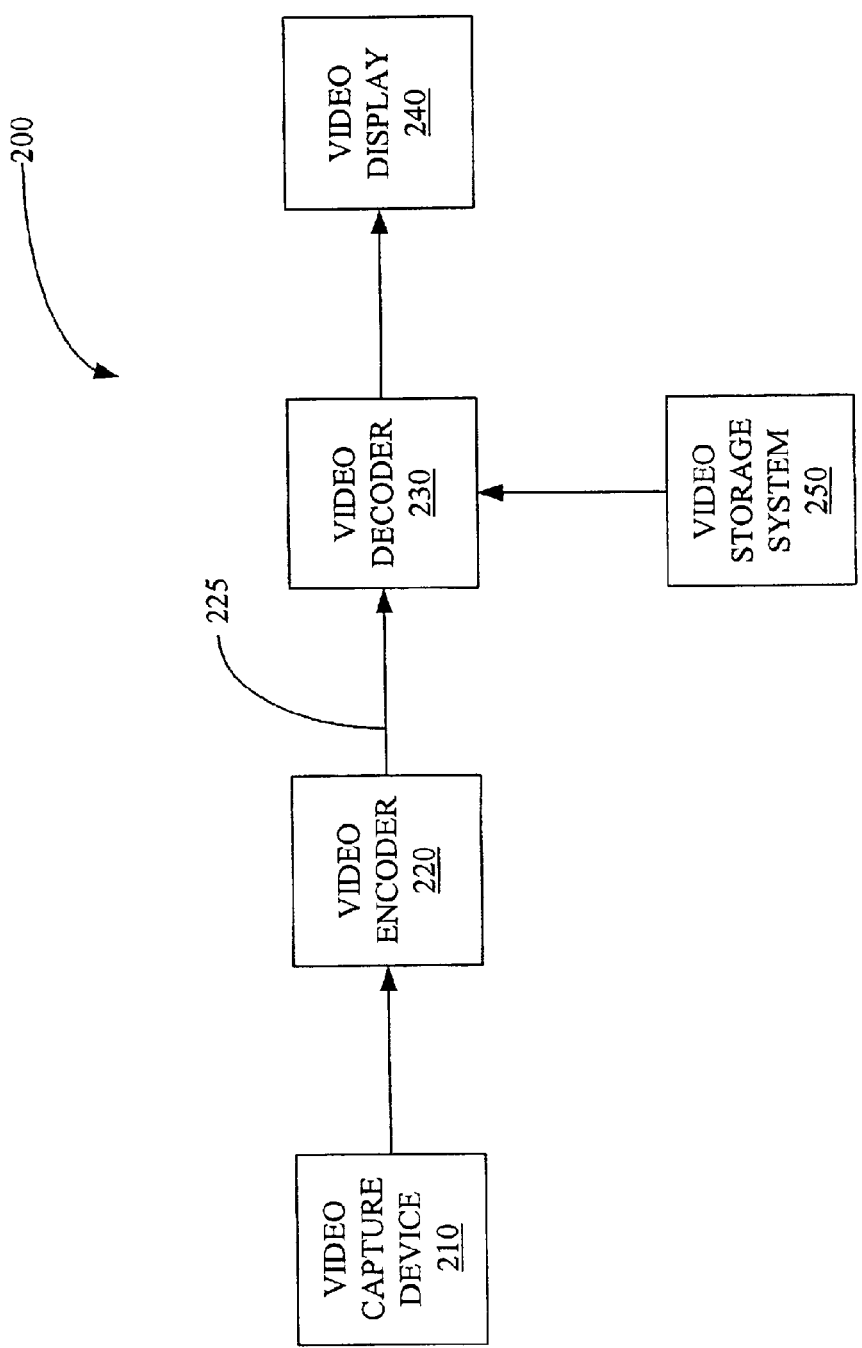
FIG. 2 is a block diagram of a digital video system.
Figure 3:
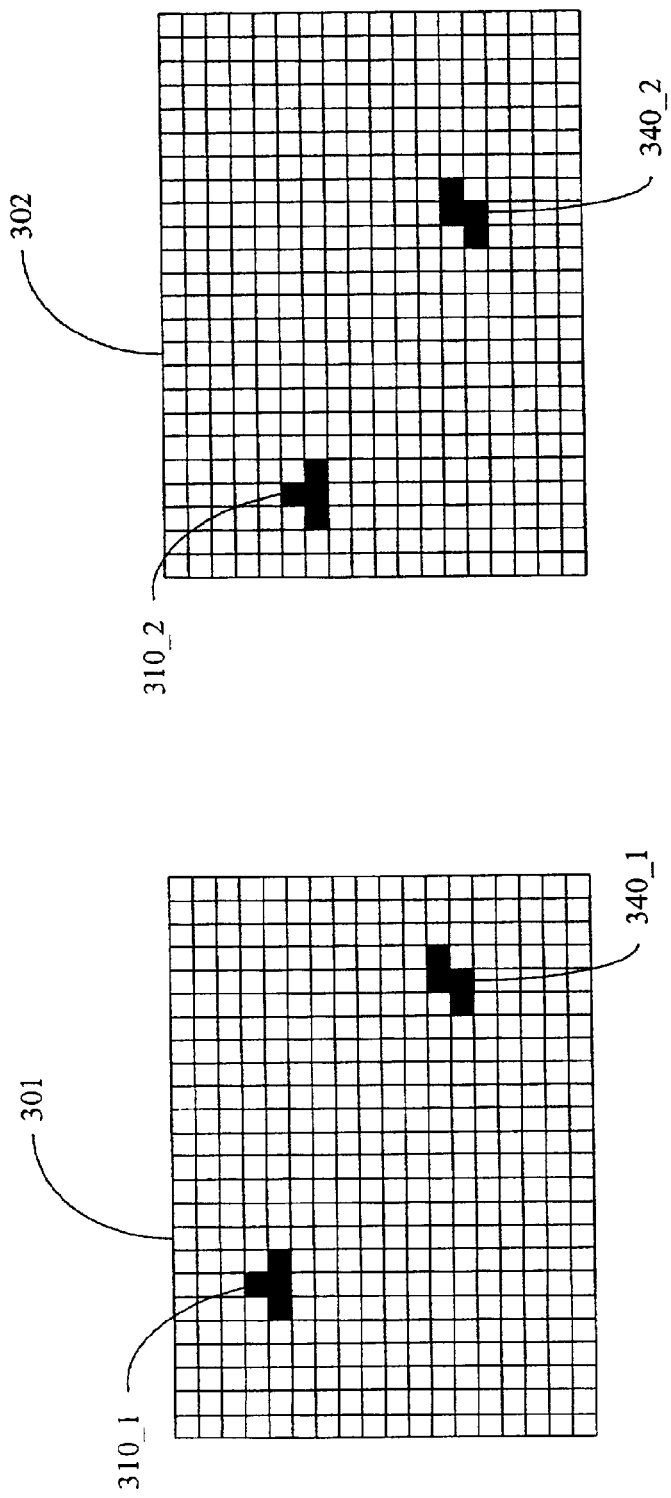
FIG. 3 is an illustration of object encoding of a digital video stream.
Figure 4:
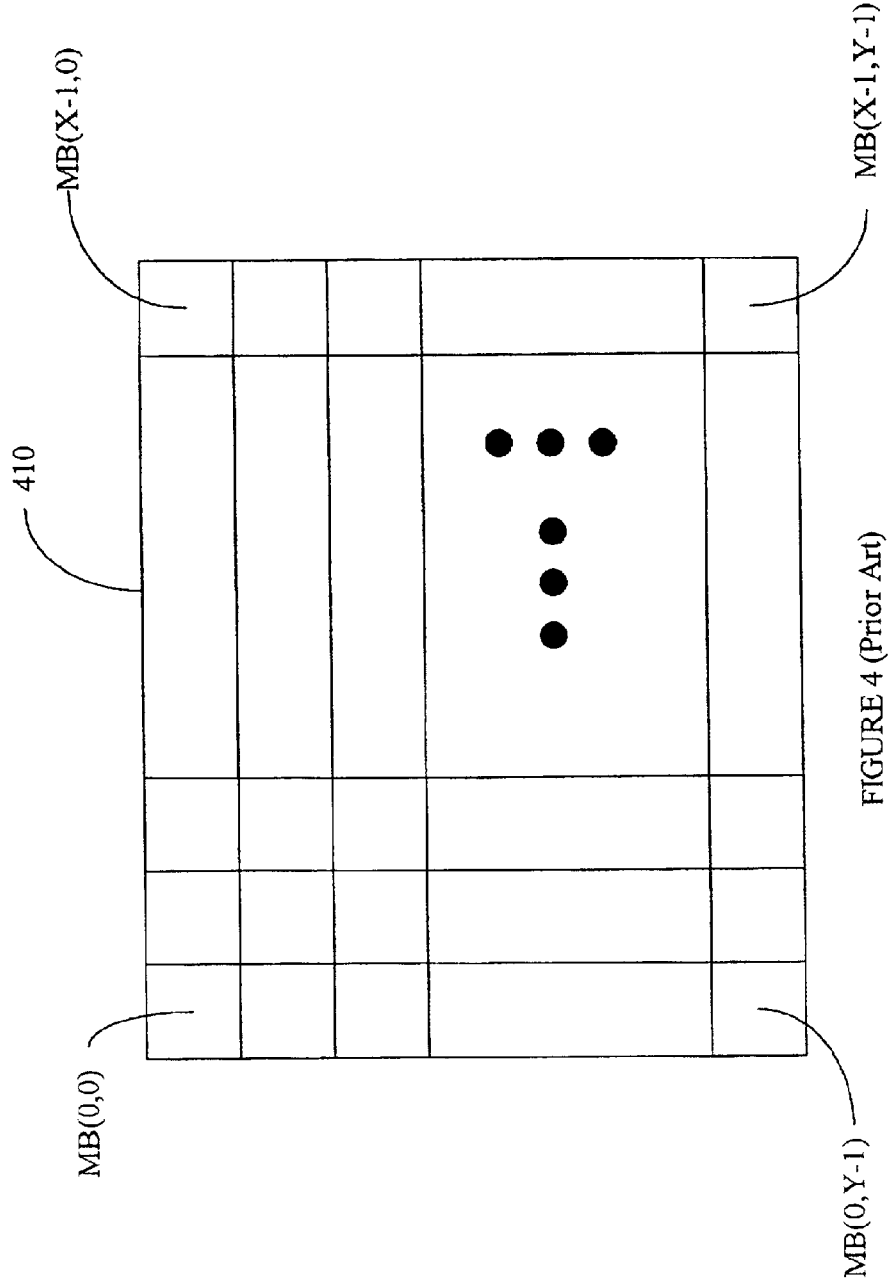
FIG. 4 is a diagram of a digital image divided into macroblocks.
Figure 5B:
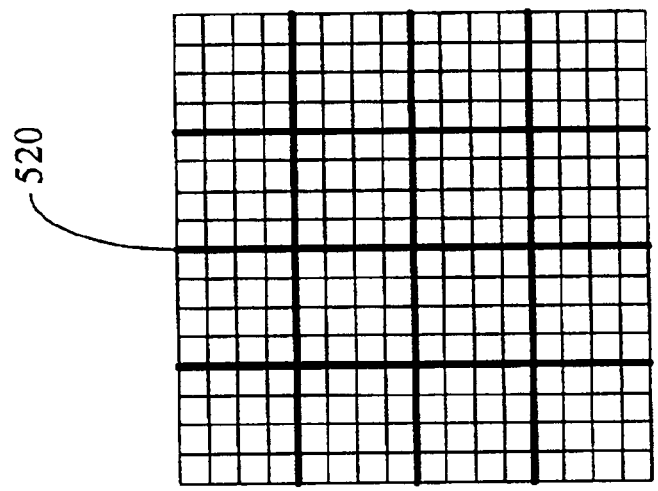
FIGS. 5*a*)–5(*b*) are an illustration of typical macroblocks.
Figure 5A:
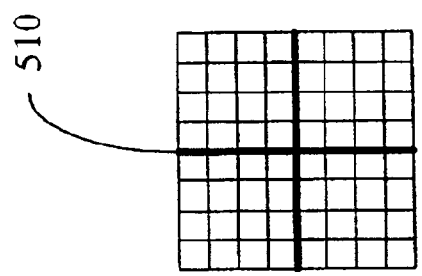
Figure 6A:
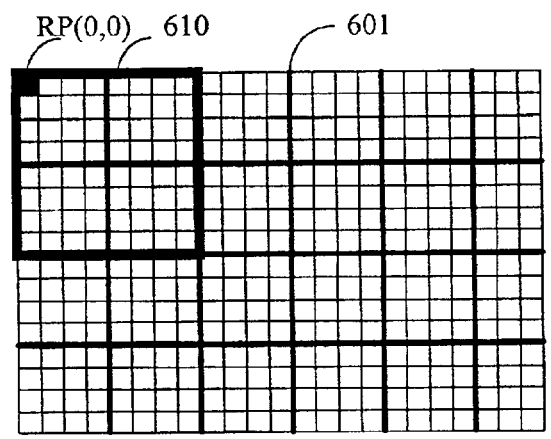
FIGS. 6(*a*)–6(*f*) illustrate a conventional method of determining motion vectors to encode a digital video stream.
Figure 6B:
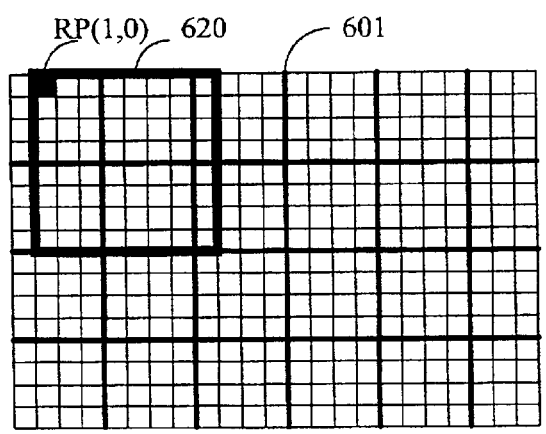
Figure 6C:
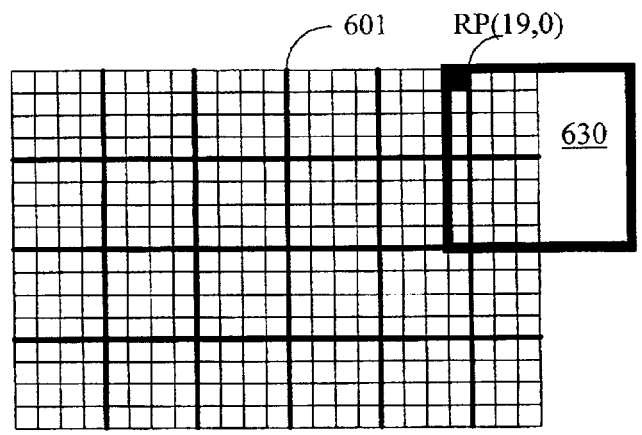
Figure 6D:
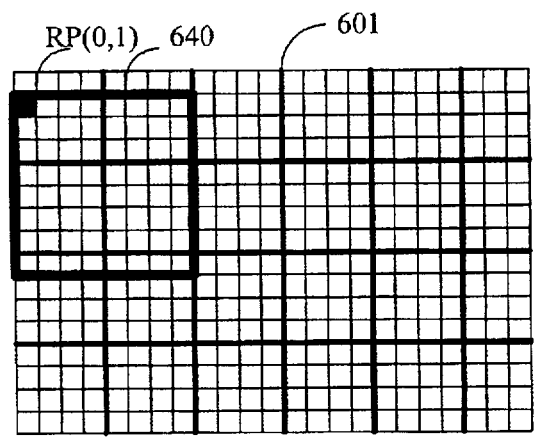
Figure 6E:
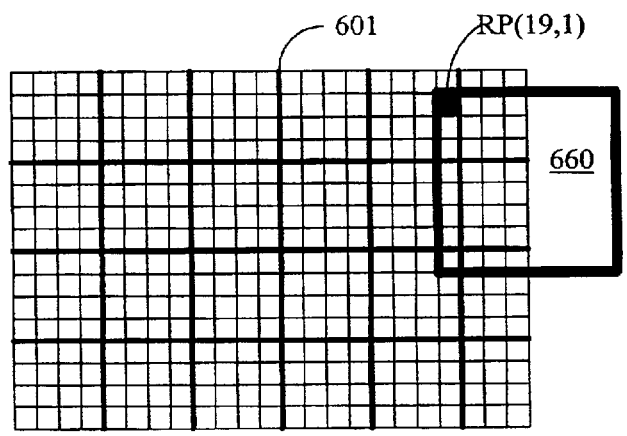
Figure 6F:
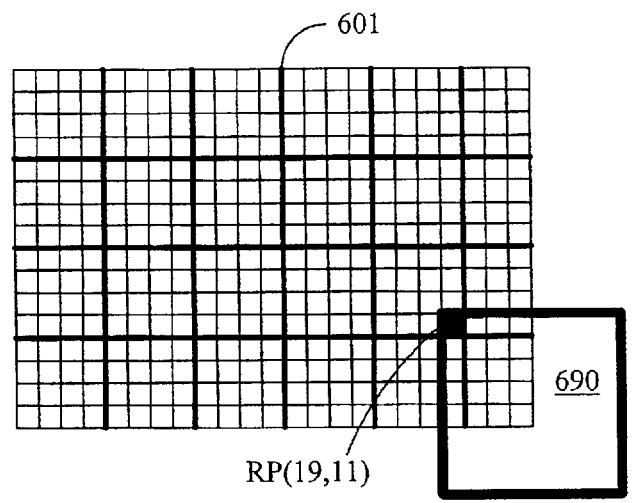
Figure 7:
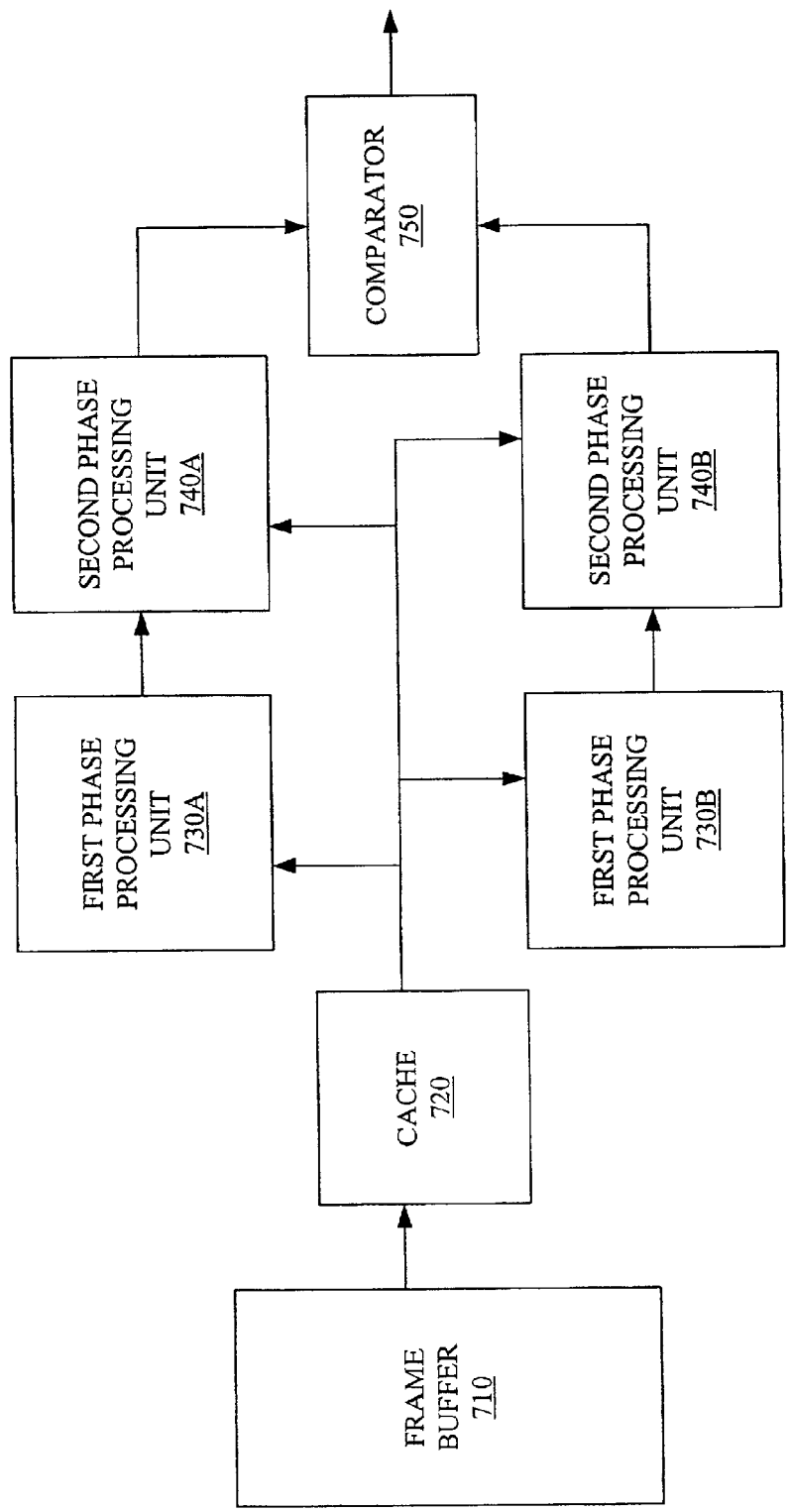
FIG. 7 is a block diagram of a video encoding system in accordance with one embodiment of the present invention.

FIG. 7 is a block diagram of a video encoder 700 in accordance with one embodiment of the present invention. Video encoder 700 includes a frame buffer 710, a cache 720, first phase processing units 730A and 730B, second phase processing units 740A and 740B, and an accumulating comparator 750. Frame buffer 710 stores the digital images of digital video stream that is being encoded to use motion vectors and macroblocks. Typically Frame buffer 710 uses high density but relatively slow memory. Thus a Cache 720 is included to improve access to frame buffer 710. In general, cache 720 is configured to hold a macroblock MB(x, y) and the pixels in the preceding image needed to perform the motion vector calculations.

Cache 720 provides the macroblock MB(x, y) and the pixels of the preceding image to first phase processing units 730A and 730B and to second phase processing units 740A and 740B. As explained in more detail below, the various pixel blocks are divided into multiple sets of pixel blocks. First phase processing units 730A and 730B work in parallel to compare macroblock MB(X, y) to two different sets of pixel blocks from the preceding image to find the closest matching pixel block in each set. First phase processing units 730A and 730B use only a subset of the pixels in preceding image in determining the closest matching pixel block in each set to reduce the number of computations needed for the comparisons. Then second phase processing units 740A and 740B compute a more accurate difference measure for each closest matching pixel block by using more pixels in the comparison between each of the closest matching pixel blocks and macroblock MB(x, y). The difference measures are provided to accumulating comparator 950 which determines which of the difference measure is smaller and stores the smaller difference measure as well as the coordinates of the reference pixel for the corresponding closest matching pixel blocks. Then First phase processing units 730A and 730B begin to process another two sets of pixel blocks as described above. Second Phase processing units 740A and 740B compute more accurate different measure for the closest matching pixel blocks. Accumulating comparator compares the difference measures from second phase processing unit 740A and 740B with the difference measure stored from the previous set and stores the smaller difference measure as well as the coordinates of the reference pixel for the corresponding closest matching pixel blocks. After all sets of pixel blocks have been processed, the motion vector for macroblock MB(x, y) is obtained by subtracting the coordinates of the reference pixel stored in the accumulating comparator 750 from the coordinates of the reference pixel of macroblock MB(x, y), i.e. if the coordinates stored in the accumulating comparator 950 is (i, j) the motion vector for macroblock MB(x, y) is equal to (x−i, j−y). One embodiment of the present invention, which is described in more details below, divides the pixel groups of the preceding image into 16 sets. However, any number of sets may be used. Furthermore, the principles of the present invention can be used with a single first phase processing unit and a single second phase processing unit or with more than two first phase processing units and second phase processing units. In addition, many embodiments of the present invention combine the first phase processing unit with the second phase processing unit.

As explained above first phase processing units 730A and 730B and Second phase processing units 740A and 740B use only a subset of the pixels of the preceding image. Specifically, in some embodiment of the present invention, a predetermined pattern of pixels is selected in the preceding image regardless of the actual data content of the preceding image. Then a subpattern is selected from the predetermined pattern. In most embodiments of the present invention the subpattern uses half the pixels of the predetermined pattern.

Figure 8B:
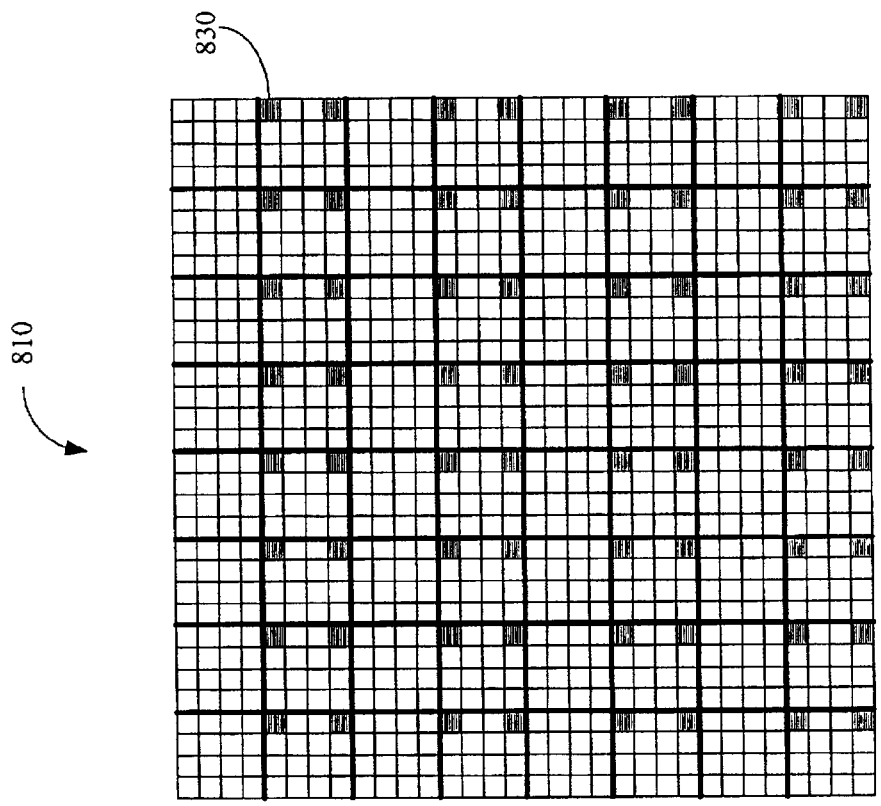
FIGS. 8(*a*)–8(*b*) illustrate the comparison points in digital images in accordance with one embodiment of the present invention.
Figure 8A:
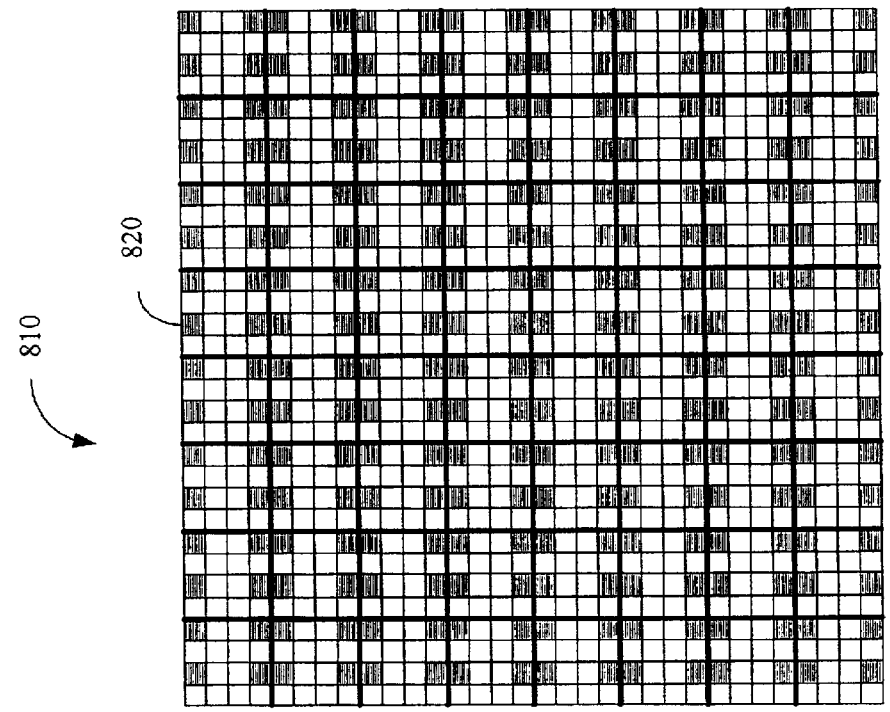

FIGS. 8(a) and 8(b) illustrate a predetermined pattern 820 of pixels and a subpattern 830 in accordance with a second embodiment of the present invention. Specifically, FIG. 8(a) illustrates predetermined pattern 820 as comprising the shaded pixels of preceding image 810. In FIG. 8(a), a pixel P(x, y) is in predetermined pattern 820 if and only if y plus 4 is a multiple of four or y plus 5 is a multiple of four and x is an odd number. Thus, predetermined pattern 820 includes only one-fourth of the pixels in preceding image 810. FIG. 8(b) illustrates subpattern 830 as comprising the shaded pixels of preceding image 810. In FIG. 8(b), a pixel P(x, y) is in subpattern 830 if and only if y plus 4 is a multiple of 8 or Y plus one is a multiple of 8 and x plus 1 is a multiple of 4. Thus, subpattern 830 contains only one-sixteenths of the pixels in preceding image 810.

Figure 9B:
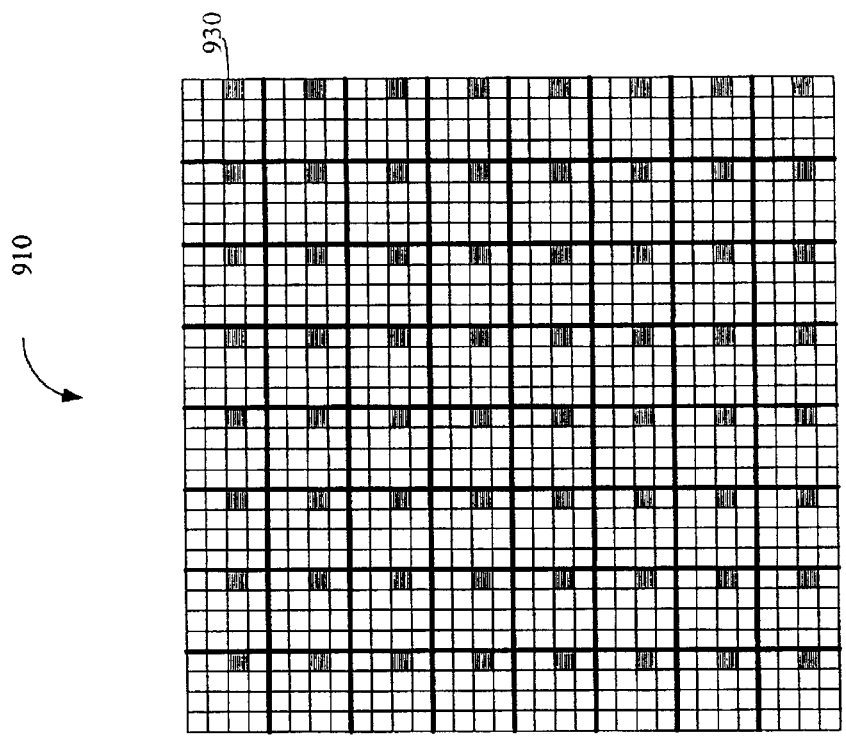
FIGS. 9(*a*)–9(*b*) illustrate the comparison points in digital images in accordance with a second embodiment of the present invention.
Figure 9A:
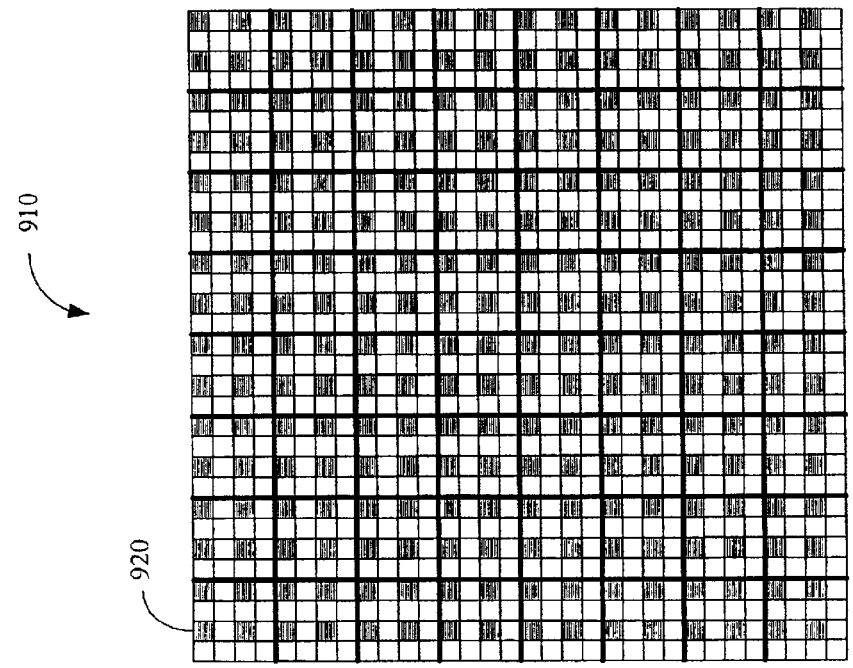

FIGS. 9(a) and 9(b) illustrate a predetermined pattern 920 and a subpattern 930 in accordance with another embodiment of the present invention. Specifically, FIG. 9(a) illustrates predetermined pattern 920 as comprising the shaded pixels of preceding image 910. In FIG. 9(a), a pixel P(x, y) is in predetermined pattern 920 if and only if x is an even number and y is an odd numbers. Thus, predetermined pattern 920 includes only one-fourth of the pixels in preceding image 910. FIG. 9(b) illustrates subpattern 930 as comprising the shaded pixels of preceding image 910. In FIG. 9(b), a pixel P(x, y) is in subpattern 930 if and only if x is equal to three plus a multiple of four and y+2 is a multiple of four. Thus, subpattern 930 contains only one-sixteenths of the pixels in preceding image 910.

Thus, if video encoder 700 (FIG. 7) uses predetermined pattern 820 and subpattern 830, first phase processing units 730A and 730B would use only the pixels in subpattern 830 to calculate a difference measure for a macroblock MB(x, y). However, second phase processing units 740A and 740B would use the pixels in predetermined pattern 820 to calculate a difference measure for a macroblock MB(x, y). Mathematically, first phase processing units 730A and 730B calculate a difference measure DM for a pixel block PB(u, v) and macroblock MB(x, y) by computing the sum of the absolute differences of the intensities of the corresponding pixels of the previous image containing pixel block PB(u,v) and the current image containing macroblock MB(x,y). Table 1 provides the coordinates of the 16 pairs of the corresponding pixels in the previous image and the current image for the subpattern of FIG. 8(b). In Table 1, the notation (i M j) denotes the modulo function which returns the integer remainder of i divided by j.

TABLE 1

| Previous Image | Current Image |
| --- | --- |
| (u + 3 − (u M 4), v + 4 − (v M 4)) | (x + 3 − (u M 4), y + 4 − (v M 4)) |
| (u + 3 − (u M 4), v + 7 − (v M 4)) | (x + 3 − (u M 4), y + 7 − (v M 4)) |
| (u + 3 − (u M 4), v + 12 − (v M 4)) | (x + 3 − (u M 4), y + 12 − (v M 4)) |
| (u + 3 − (u M 4), v + 15 − (v M 4)) | (x + 3 − (u M 4), y + 15 − (v M 4)) |
| (u + 7 − (u M 4), v + 4 − (v M 4)) | (x + 7 − (u M 4), y + 4 − (v M 4)) |
| (u + 7 − (u M 4), v + 7 − (v M 4)) | (x + 7 − (u M 4), y + 7 − (v M 4)) |
| (u + 7 − (u M 4), v + 12 − (v M 4)) | (x + 7 − (u M 4), y + 12 − (v M 4)) |
| (u + 7 − (u M 4), v + 15 − (v M 4)) | (x + 7 − (u M 4), y + 15 − (v M 4)) |
| (u + 11 − (u M 4), v + 4 − (v M 4)) | (x + 11 − (u M 4), y + 4 − (v M 4)) |
| (u + 11 − (u M 4), v + 7 − (v M 4)) | (x + 11 − (u M 4), y + 7 − (v M 4)) |
| (u + 11 − (u M 4), v + 12 − (v M 4)) | (x + 11 − (u M 4), y + 12 − (v M 4)) |
| (u + 11 − (u M 4), v + 15 − (v M 4)) | (x + 11 − (u M 4), y + 15 − (v M 4)) |
| (u + 15 − (u M 4), v + 4 − (v M 4)) | (x + 15 − (u M 4), y + 4 − (v M 4)) |
| (u + 15 − (u M 4), v + 7 − (v M 4)) | (x + 15 − (u M 4), y + 7 − (v M 4)) |

TABLE 1-continued

| Previous Image | Current Image |
| --- | --- |
| (u + 15 − (u M 4), v + 12 − (v M 4)) | (x + 15 − (u M 4), y + 12 − (v M 4)) |
| (u + 15 − (u M 4), v + 15 − (v M 4)) | (x + 15 − (u M 4), y + 15 − (v M 4)) |

As explained above, second phase processing units 740A and 740B calculate difference measures of the predetermined pattern of FIG. 8(*a*). Thus, Second phase processing units 740A and 740B use the 64 pairs of the corresponding pixels in Table 2.

TABLE 2

| Previous Image | Current Image |
| --- | --- |
| (u + 1 − (u M 4), v + 0 − (v M 4)) | (x + 1 − (u M 4), y + 0 − (v M 4)) |
| (u + 1 − (u M 4), v + 3 − (v M 4)) | (x + 1 − (u M 4), y + 3 − (v M 4)) |
| (u + 1 − (u M 4), v + 4 − (v M 4)) | (x + 1 − (u M 4), y + 4 − (v M 4)) |
| (u + 1 − (u M 4), v + 7 − (v M 4)) | (x + 1 − (u M 4), y + 7 − (v M 4)) |
| (u + 1 − (u M 4), v + 8 − (v M 4)) | (x + 1 − (u M 4), y + 8 − (v M 4)) |
| (u + 1 − (u M 4), v + 11 − (v M 4)) | (x + 1 − (u M 4), y + 11 − (v M 4)) |
| (u + 1 − (u M 4), v + 12 − (v M 4)) | (x + 1 − (u M 4), y + 12 − (v M 4)) |
| (u + 1 − (u M 4), v + 15 − (v M 4)) | (x + 1 − (u M 4), y + 15 − (v M 4)) |
| (u + 3 − (u M 4), v + 0 − (v M 4)) | (x + 3 − (u M 4), y + 0 − (v M 4)) |
| (u + 3 − (u M 4), v + 3 − (v M 4)) | (x + 3 − (u M 4), y + 3 − (v M 4)) |
| (u + 3 − (u M 4), v + 4 − (v M 4)) | (x + 3 − (u M 4), y + 4 − (v M 4)) |
| (u + 3 − (u M 4), v + 7 − (v M 4)) | (x + 3 − (u M 4), y + 7 − (v M 4)) |
| (u + 3 − (u M 4), v + 8 − (v M 4)) | (x + 3 − (u M 4), y + 8 − (v M 4)) |
| (u + 3 − (u M 4), v + 11 − (v M 4)) | (x + 3 − (u M 4), y + 11 − (v M 4)) |
| (u + 3 − (u M 4), v + 12 − (v M 4)) | (x + 3 − (u M 4), y + 12 − (v M 4)) |
| (u + 3 − (u M 4), v + 15 − (v M 4)) | (x + 3 − (u M 4), y + 15 − (v M 4)) |
| (u + 5 − (u M 4), v + 0 − (v M 4)) | (x + 5 − (u M 4), y + 0 − (v M 4)) |
| (u + 5 − (u M 4), v + 3 − (v M 4)) | (x + 5 − (u M 4), y + 3 − (v M 4)) |
| (u + 5 − (u M 4), v + 4 − (v M 4)) | (x + 5 − (u M 4), y + 4 − (v M 4)) |
| (u + 5 − (u M 4), v + 7 − (v M 4)) | (x + 5 − (u M 4), y + 7 − (v M 4)) |
| (u + 5 − (u M 4), v + 8 − (v M 4)) | (x + 5 − (u M 4), y + 8 − (v M 4)) |
| (u + 5 − (u M 4), v + 11 − (v M 4)) | (x + 5 − (u M 4), y + 11 − (v M 4)) |
| (u + 5 − (u M 4), v + 12 − (v M 4)) | (x + 5 − (u M 4), y + 12 − (v M 4)) |
| (u + 5 − (u M 4), v + 15 − (v M 4)) | (x + 5 − (u M 4), y + 15 − (v M 4)) |
| (u + 7 − (u M 4), v + 0 − (v M 4)) | (x + 7 − (u M 4), y + 0 − (v M 4)) |
| (u + 7 − (u M 4), v + 3 − (v M 4)) | (x + 7 − (u M 4), y + 3 − (v M 4)) |
| (u + 7 − (u M 4), v + 4 − (v M 4)) | (x + 7 − (u M 4), y + 4 − (v M 4)) |
| (u + 7 − (u M 4), v + 7 − (v M 4)) | (x + 7 − (u M 4), y + 7 − (v M 4)) |
| (u + 7 − (u M 4), v + 8 − (v M 4)) | (x + 7 − (u M 4), y + 8 − (v M 4)) |
| (u + 7 − (u M 4), v + 11 − (v M 4)) | (x + 7 − (u M 4), y + 11 − (v M4)) |
| (u + 7 − (u M 4), v + 12 − (v M 4)) | (x + 7 − (u M 4), y + 12 − (v M 4)) |
| (u + 7 − (u M 4), v + 15 − (v M 4)) | (x + 7 − (u M 4), y + 15 − (v M 4)) |
| (u + 9 − (u M 4), v + 0 − (v M 4)) | (x + 9 − (u M 4), y + 0 − (v M 4)) |
| (u + 9 − (u M 4), v + 3 − (v M 4)) | (x + 9 − (u M 4), y + 3 − (v M 4)) |
| (u + 9 − (u M 4), v + 4 − (v M 4)) | (x + 9 − (u M 4), y + 4 − (v M 4)) |
| (u + 9 − (u M 4), v + 7 − (v M 4)) | (x + 9 − (u M 4), y + 7 − (v M 4)) |
| (u + 9 − (u M 4), v + 8 − (v M 4)) | (x + 9 − (u M 4), y + 8 − (v M 4)) |
| (u + 9 − (u M 4), v + 11 − (v M 4)) | (x + 9 − (u M 4), y + 11 − (v M 4)) |
| (u + 9 − (u M 4), v + 12 − (v M 4)) | (x + 9 − (u M 4), y + 12 − (v M 4)) |
| (u + 9 − (u M 4), v + 15 − (v M 4)) | (x + 9 − (u M 4), y + 15 − (v M 4)) |
| (u + 11 − (u M 4), v + 0 − (v M 4)) | (x + 11 − (u M 4), y + 0 − (v M 4)) |
| (u + 11 − (u M 4), v + 3 − (v M 4)) | (x + 11 − (u M 4), y + 3 − (v M 4)) |
| (u + 11 − (u M 4), v + 4 − (v M 4)) | (x + 11 − (u M 4), y + 4 − (v M 4)) |
| (u + 11 − (u M 4), v + 7 − (v M 4)) | (x + 11 − (u M 4), y + 7 − (v M 4)) |
| (u + 11 − (u M 4), v + 8 − (v M 4)) | (x + 11 − (u M 4), y + 8 − (v M 4)) |
| (u + 11 − (u M 4), v + 11 − (v M 4)) | (x + 11 − (u M 4), y + 11 − (v M 4)) |
| (u + 11 − (u M 4), v + 12 − (v M 4)) | (x + 11 − (u M 4), y + 12 − (v M 4)) |
| (u + 11 − (u M 4), v + 15 − (v M 4)) | (x + 11 − (u M 4), y + 15 − (v M 4)) |
| (u + 13 − (u M 4), v + 0 −(v M 4)) | (x + 13 − (u M 4), y + 0 − (v M 4)) |
| (u + 13 − (u M 4), v + 3 −(v M 4)) | (x + 13 − (u M 4), y + 3 − (v M 4)) |
| (u + 13 − (u M 4), v + 4 − (v M 4)) | (x + 13 − (u M 4), y + 4 − (v M 4)) |
| (u + 13 − (u M 4), v + 7 − (v M 4)) | (x + 13 − (u M 4), y + 7 − (v M 4)) |
| (u + 13 − (u M 4), v + 8 − (v M 4)) | (x + 13 − (u M 4), y + 8 − (v M 4)) |
| (u + 13 − (u M 4), v + 11 − (v M 4)) | (x + 13 − (u M 4), y + 11 − (v M 4)) |
| (u + 13 − (u M 4), v + 12 − (v M 4)) | (x + 13 − (u M 4), y + 12 − (v M 4)) |
| (u + 13 − (u M 4), v + 15 − (v M 4)) | (x + 13 − (u M 4), y + 15 − (v M 4)) |
| (u + 15 − (u M 4), v + 0 − (v M 4)) | (x + 15 − (u M 4), y + 0 − (v M 4)) |
| (u + 15 − (u M 4), v + 3 − (v M 4)) | (x + 15 − (u M 4), y + 3 − (v M 4)) |
| (u + 15 − (u M 4), v + 4 − (v M 4)) | (x + 15 − (u M 4), y + 4 − (v M 4)) |

TABLE 2-continued

| Previous Image | Current Image |
| --- | --- |
| (u + 15 − (u M 4), v + 7 − (v M 4)) | (x + 15 − (u M 4), y + 7 − (v M 4)) |
| (u + 15 − (u M 4), v + 8 − (v M 4)) | (x + 15 − (u M 4), y + 8 − (v M 4)) |
| (u + 15 − (u M 4), v + 11 − (v M 4)) | (x + 15 − (u M 4), y + 11 − (v M 4)) |
| (u + 15 − (u M 4), v + 12 − (v M 4)) | (x + 15 − (u M 4), y + 12 − (v M 4)) |
| (u + 15 − (u M 4), v + 15 − (v M 4)) | (x + 15 − (u M 4), y + 15 − (v M 4)) |

Figure 10B:
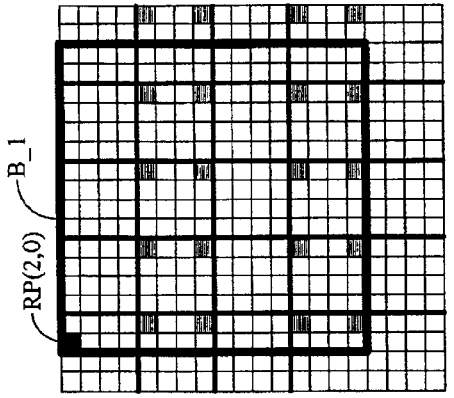
FIGS. 10(*a*)–10(*p*) illustrate the starting location of group sets in accordance with one embodiment of the present invention.
Figure 10D:
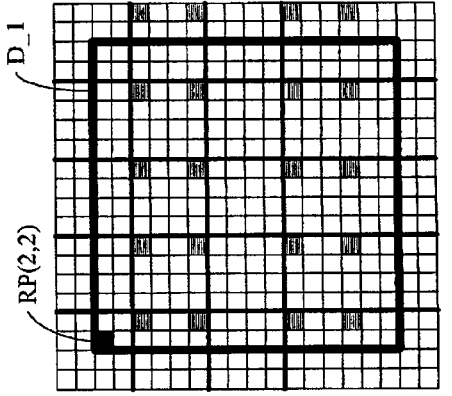
Figure 10A:
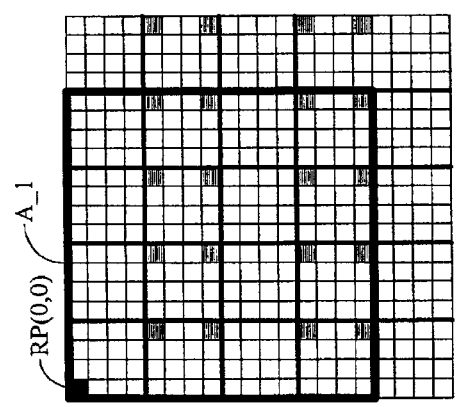
Figure 10C:
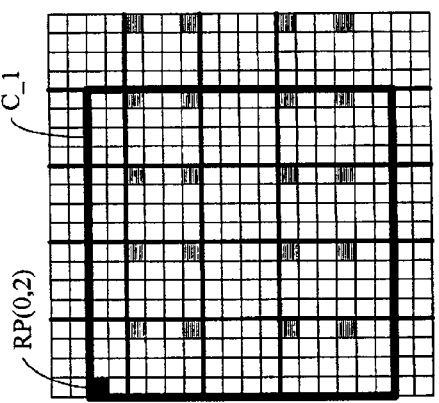
Figure 10F:
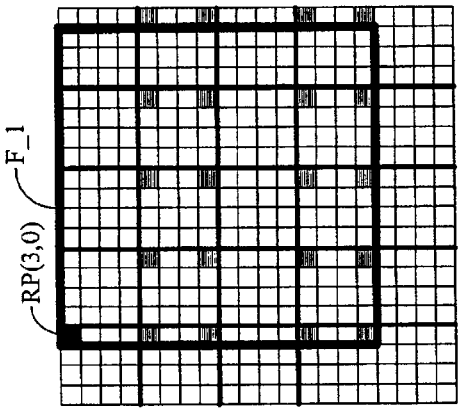
Figure 10H:
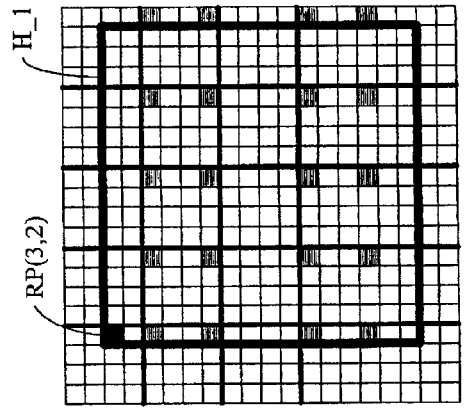
Figure 10E:
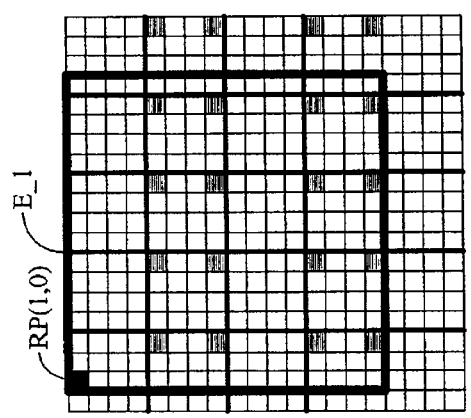
Figure 10G:
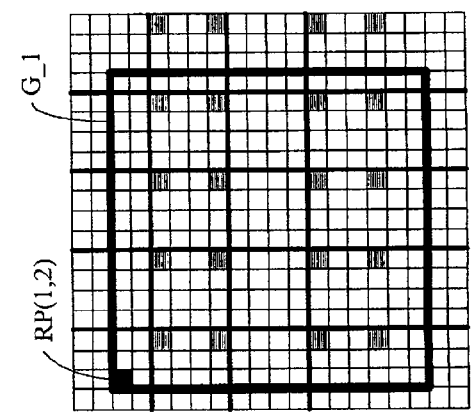
Figure 10J:
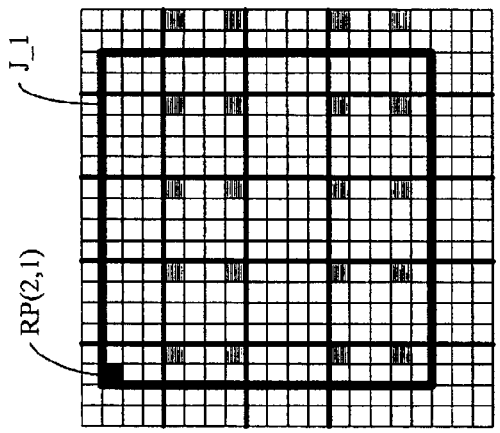
Figure 10L:
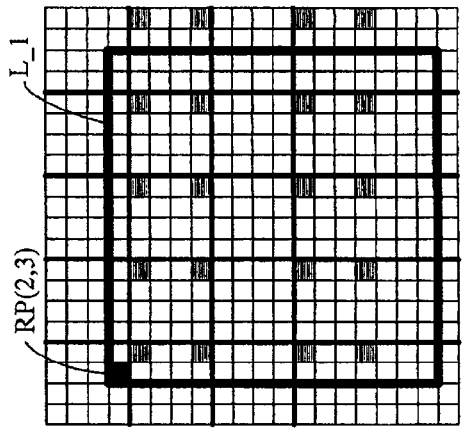
Figure 10I:
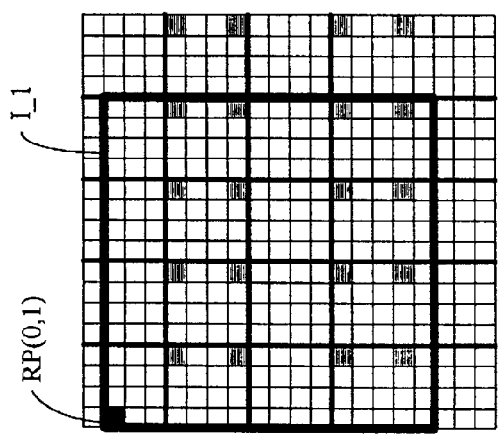
Figure 10K:
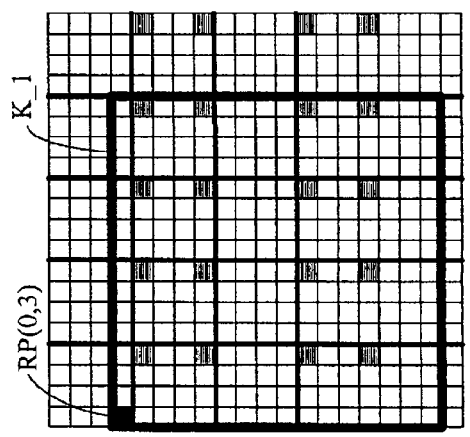
Figure 10M:
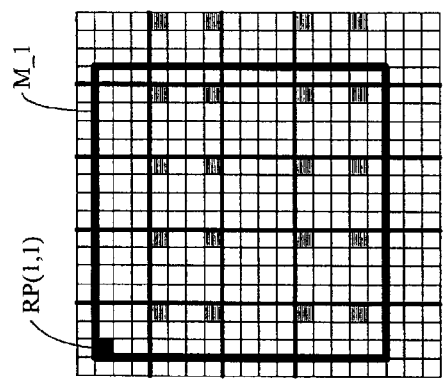
Figure 10N:
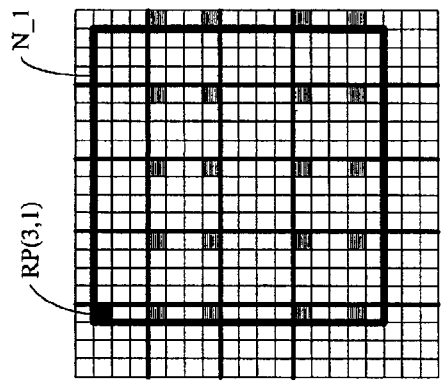
Figure 10O:
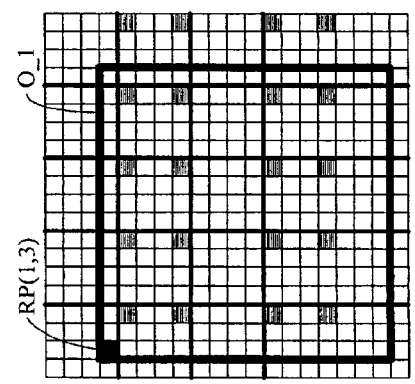
Figure 10P:
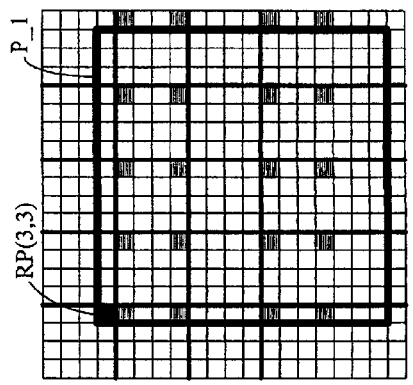

FIGS. 10(a)–10(p) illustrate how pixel blocks of a preceding image are divided into 16 sets of pixel blocks in accordance with one embodiment of the present invention. Each of FIGS. 10(a)–10(p) shows the leading pixel block of each set of pixel blocks. For clarity, the set corresponding to FIGS. 10(a)–10(p) are referred to as pixel block set A, pixel block set B, and pixel block set P, respectively. Each set of pixel blocks contains all pixel blocks in which the reference pixel of the pixel block is offset by a multiple of four vertically or horizontally from the reference pixel of the leading pixel block.

As shown in FIG. 10(a), leading pixel block A_1 of pixel block set A has reference pixel RP(0, 0). Thus, pixel block set A includes all pixel blocks having reference pixel RP(m, n), where m and n are multiples of 4. As shown in FIG. 10(b), leading pixel block B_1 of pixel block set B has reference pixel RP(2, 0). Thus, pixel block set B includes all pixel blocks having reference pixel RP(m, n), where (m−2) and n are multiples of 4.

As shown in FIG. 10(c), leading pixel block C_1 of pixel block set C has reference pixel RP(0, 2). Thus, pixel block set C includes all pixel blocks having reference pixel RP(m, n), where m and (n−2) are multiples of 4. As shown in FIG. 10(d), leading pixel block D_1 of pixel block set D has reference pixel RP(2, 2). Thus, pixel block set D includes all pixel blocks having reference pixel RP(m, n), where (m−2) and (n−2) are multiples of 4.

As shown in FIG. 10(e), leading pixel block E_1 of pixel block set E has reference pixel RP(1,0). Thus, pixel block set E includes all pixel blocks having reference pixel RP(m, n), where; (m−1) and n are multiples of 4. As shown in FIG. 10(f), leading pixel block F_1 of pixel block set F has reference pixel RP(3, 0). Thus, pixel block set F includes all pixel blocks having reference pixel RP(m, n), where (m−3) and n are multiples of 4.

As shown in FIG. 10(g), leading pixel block G_1 of pixel block set G has reference pixel RP(1, 2). Thus, pixel block set G includes all pixel blocks having reference pixel RP(m, n), where (m−1) and (n−2) are multiples of 4. As shown in FIG. 10(h), leading pixel block H_1 of pixel block set H has reference pixel RP(3, 2). Thus, pixel block set H includes all pixel blocks having reference pixel RP(m, n), where (m−3) and (n−2) are multiples of 4.

As shown in FIG. 10(i), leading pixel block I_1 of pixel block set I has reference pixel RP(0, 1). Thus, pixel block set I includes all pixel blocks having reference pixel RP(m, n), where m and (n−1) are multiples of 4. As shown in FIG. 10(j), leading pixel block J_1 of pixel block set J has reference pixel RP(2, 1). Thus, pixel block set J includes all pixel blocks having reference pixel RP(m, n), where (m−2) and (n−1) are multiples of 4.

As shown in FIG. 10(k), leading pixel block K_1 of pixel block set K has reference pixel RP(0, 3). Thus, pixel block set K includes all pixel blocks having reference pixel RP(m, n), where m and (n−3) are multiples of 4. As shown in FIG. 10(l), leading pixel block L_1 of pixel block set L has reference pixel RP(2, 3). Thus, pixel block set L includes all pixel blocks having reference pixel RP(m, n), where (m−2) and (n−3) are multiples of 4.

As shown in FIG. 10(m), leading pixel block M_1 of pixel block set M has reference pixel RP(1, 1). Thus, pixel block set M includes all pixel blocks having reference pixel RP(m, n), where (m−1) and (n−1) are multiples of 4. As shown in FIG. 10(n), leading pixel block N_1 of pixel block set N has reference pixel RP(3, 1). Thus, pixel block set N includes all pixel blocks having reference pixel RP(m, n), where (m−3) and (n−1) are multiples; of 4.

As shown in FIG. 10(o), leading pixel block O_1 of pixel block set O has reference pixel RP(1,3). Thus, pixel block set O includes all pixel blocks having reference pixel RP(m, n), where (m−1) and (n−3) are multiples of 4. As shown in FIG. 10(p), leading pixel block P_1 of pixel block set P has reference pixel RP(3, 3). Thus, pixel block set P includes all pixel blocks having reference pixel RP(m, n), where (m−3) and (n−3) are multiples of 4.

Figure 11:
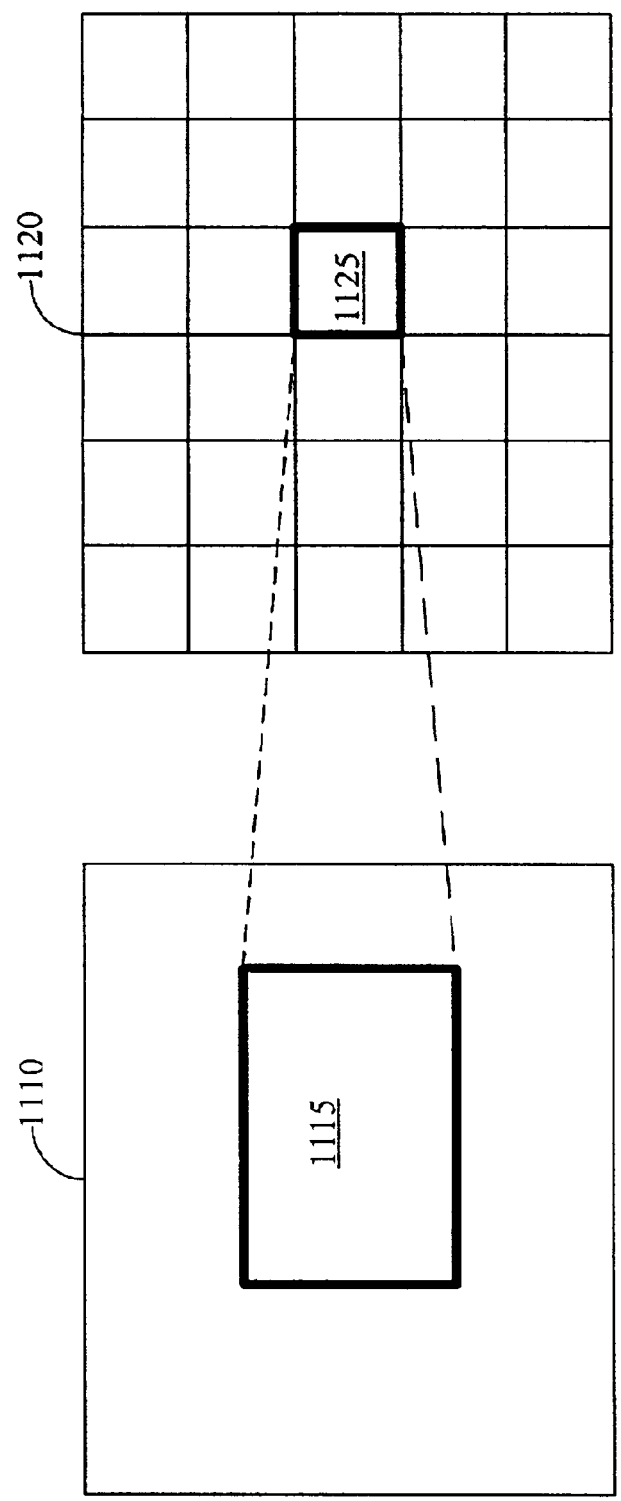
FIG. 11 illustrates a search window in accordance with one embodiment of the present invention.

FIG. 11 illustrates a method to further reduce the computational requirements of computing motion vectors. FIG. 11 shows a preceding image 1110 and an image 1120 of a video sequence. Image 1120 is divided into 16×16 macroblocks including macroblock 1125, having reference pixel (x, y). Rather than comparing macroblock 1125 with all the possible pixel blocks in preceding image 1110, macroblock 1125 is only compared with the pixel blocks within a search window 1115. In general, smaller search windows can be used with video streams having very few fast moving objects. The coordinates of search window 1115 are determined by using the coordinates of macroblock 1125. Specifically, in one embodiment of the present invention, the top left coordinate of search window 1115 is equal to (x−63, y−31) and the bottom right coordinate is equal to (x+16+63, y+16+31). Thus, search window 1115 is centered around the coordinates of macroblock 1125 and includes 63 lines above and below the coordinates of macroblock 1125 and 31 columns on the left and right side of the coordinates of macroblock 1125. Other embodiments of the present invention may define different search windows.

Figure 12:
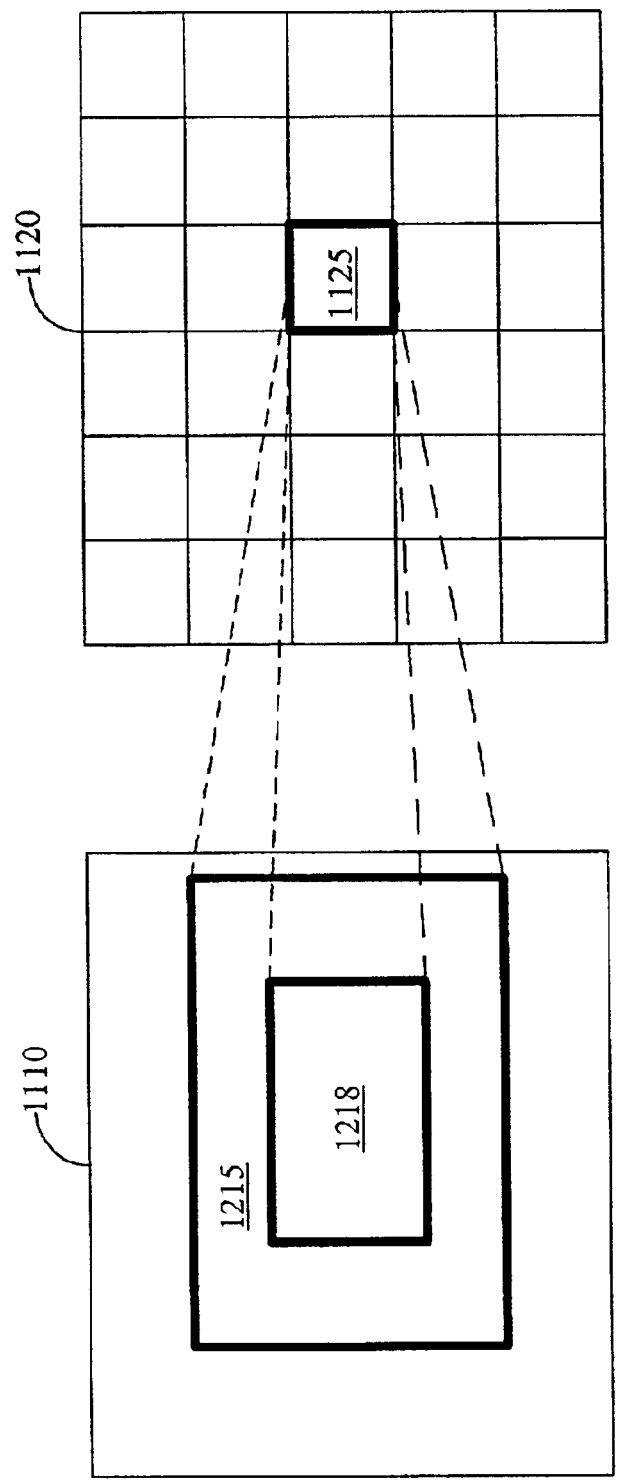
FIG. 12 illustrates dual search windows in accordance with a second embodiment of the present invention.

In accordance with another embodiment of the present invention, a coarse search window and a fine search window are used. Specifically, as illustrated in FIG. 12, a coarse search window 1215 and a fine search window 1218 are defined in previous image 1110. For example, an embodiment of video encoder 700 (FIG. 7) uses only one fourth of the pixel blocks in coarse search window 1215 by skipping every other pixel block both vertically and horizontally.

Thus, for example, if the top left coordinate of the coarse search window 1215 is (m, n), video encoder 700 would only compare macroblock 1125 with pixel blocks having reference pixels with coordinates of (m+2j, n+2k), where j and k are integers greater than or equal to zero. However, within fine search window 1218, video encoder 700 uses every pixel block in fine search window 1218. Specifically, in one embodiment of the present invention, the top left coordinate of the coarse search window 1215 is equal to (x−63, y−31) and the bottom right coordinate is equal to (x+J+63, y+K+31), where J is the width and K is the height of a macroblock. The top left coordinate of the fine search window 1218 is equal to (x−21, y−12) and the bottom right coordinate is equal to (x+J+21, y+K+12), where J is the width and K is the height of a macroblock.

What is claimed is:

1. A method of determining a motion vector for a macroblock of a present image from a previous image, the method comprising:

selecting a first set of pixel blocks in the previous image;

computing a first difference measure for each of the pixel blocks in the first set of pixel blocks to form a plurality of first difference measures;

determining a first closest matching pixel block having a lowest first difference measure;

selecting a second set of pixel blocks in the previous image;

computing a second difference measure for each of the pixel blocks in the second set of pixel blocks to form a plurality of second difference measures;

determining a second closest matching pixel block having a lowest second difference measure;

computing a first accurate difference measure for the first closest matching pixel block, wherein the first accurate difference measure is a member of a plurality of accurate difference measures;

computing a second accurate difference measure for the second closest matching pixel block, wherein the second accurate difference measure is a member of the plurality of accurate difference measures;

selecting the first closest matching pixel block as a origin block when the first accurate difference measure is less than or equal to other members of the plurality of accurate difference measure;

selecting the second closest matching pixel block as the origin block when the second accurate difference measure is less than the first accurate difference measure and less than or equal to other members of the plurality of accurate difference measures; and computing the motion vector using the origin block and the macroblock.

2. The method of claim 1, further comprising:

selecting a third set of pixel blocks in the previous image;

computing a third difference measure for each of the pixel blocks in the third set of pixel blocks to form a plurality of third difference measures;

determining a third closest matching pixel block having a lowest third difference measure;

computing a third accurate difference measure for the third closest matching pixel block, wherein the third accurate difference measure is a member of the plurality of accurate difference measures; and selecting the third closest matching pixel block as the origin block when the third accurate difference measure is less than the first accurate difference measure and the second accurate difference measure and less than or equal to other members of the plurality of accurate difference measures.

3. The method of claim 2, further comprising:

selecting a fourth set of pixel blocks in the previous image;

computing a fourth difference measure for each of the pixel blocks in the fourth set of pixel blocks to form a plurality of fourth difference measures;

determining a fourth closest matching pixel block having a lowest fourth difference measure;

computing a fourth accurate difference measure for the fourth closest matching pixel block, wherein the fourth accurate difference measure is a member of the plurality of accurate difference measures; and selecting the fourth closest matching pixel block as the origin block when the fourth accurate difference measure is less than the first accurate difference measure, the second accurate difference measure, and the third accurate difference measure and less than or equal to other members of the plurality of accurate difference measures.

4. The method of claim 1, wherein the computing a first accurate difference measure for the first closest matching pixel block; comprises:

computing an absolute difference between each pixel in both the closest matching pixel block and a predetermined pattern of pixels with a corresponding pixel in the macroblock to create a plurality of accurate absolute differences;

summing the plurality of accurate absolute differences to compute the first accurate difference measure.

5. The method of claim 4, wherein the predetermined pattern of pixels includes less than or equal to half of the pixels in the previous image.

6. The method of claim 4, wherein the predetermined pattern of pixels includes a fourth of the pixels of the previous image.

7. The method of claim 4, wherein the y-coordinate modulo four of each pixel in the predetermined pattern of pixels has a y-coordinate is equal to three or zero.

8. The method of claim 4, wherein computing a first difference measure for each of the pixel blocks in the first set of pixel blocks to form a plurality of first difference measures comprises:

computing an absolute difference between each pixel in both the pixel block and a subpattern of the predetermined pattern of pixels with a corresponding pixel in the macroblock to create a plurality of absolute differences;

summing the plurality of absolute differences to compute the first difference measure.

9. The method of claim 1, wherein the computing a first accurate difference measure for the first closest matching pixel block; comprises:

computing a squared difference between each pixel in both the closest matching pixel block and a predetermined pattern of pixels with a corresponding pixel in the macroblock to create a plurality of accurate absolute differences;

summing the plurality of squared absolute differences to compute the first accurate difference measure.

* * * * *